(12) United States Patent
Chiorino

(10) Patent No.: US 11,639,744 B2
(45) Date of Patent: May 2, 2023

(54) METHOD FOR JOINING A BELT HAVING A REINFORCED STRUCTURE WITH INTERPENETRATED SPIRALS

(71) Applicant: Chiorino S.p.A., Biella (IT)

(72) Inventor: Matteo Chiorino, Biella (IT)

(73) Assignee: Chiorino S.p.A., Biella (IT)

( * ) Notice: Subject to any disclaimer, the term of this patent is extended or adjusted under 35 U.S.C. 154(b) by 0 days.

(21) Appl. No.: 17/529,669

(22) Filed: Nov. 18, 2021

(65) Prior Publication Data

US 2022/0154803 A1  May 19, 2022

(30) Foreign Application Priority Data

Nov. 19, 2020 (IT) .............................. 1020000027798

(51) Int. Cl.
| | |
|---|---|
| *F16G 3/10* | (2006.01) |
| *F16G 3/00* | (2006.01) |
| *B65G 15/34* | (2006.01) |
| *D21F 1/00* | (2006.01) |
| *F16G 3/02* | (2006.01) |

(52) U.S. Cl.
CPC .............. *F16G 3/10* (2013.01); *F16G 3/003* (2013.01); *B65G 15/34* (2013.01); *D21F 1/0072* (2013.01); *F16G 3/006* (2013.01); *F16G 3/02* (2013.01)

(58) Field of Classification Search
CPC . F16G 3/003; F16G 3/006; F16G 3/02; F16G 3/10; F16G 3/12; B65G 15/34; D21F 1/0072
See application file for complete search history.

(56) References Cited

U.S. PATENT DOCUMENTS

| | | | | |
|---|---|---|---|---|
| 2,566,262 | A | * 8/1951 | Traxler ..................... | B25B 7/12 254/233 |
| 5,725,269 | A | * 3/1998 | Daniels .................. | B65G 15/28 294/132 |
| 2011/0192561 | A1* | 8/2011 | Breuer ...................... | F16G 3/00 162/200 |
| 2015/0001048 | A1* | 1/2015 | Koppes ..................... | F16G 3/04 198/844.2 |

FOREIGN PATENT DOCUMENTS

| | | |
|---|---|---|
| EP | 3018253 A1 | 5/2016 |
| JP | 2002070953 A | 3/2002 |

OTHER PUBLICATIONS

Ammeraal Beltech, "Ziplink—Quickest splice method ever!", URL—https://www.katena.at/downoads/broc_en ziplink.pdf, pp. 1-6, XP055820618, (Mar. 6, 2013), Retrieved from the Internet (Jul. 2, 2021).
ConveyEquip: "Ziplink Conveyor Belt Splicing Instructions", URL—https://www.youtube.com/watch?v=oj6IM5sqY2k, (May 28, 2011), Retrieved from the Internet (Jul. 2, 2021) and (Nov. 18, 2021).
Search Report dated Jul. 6, 2021. (8 pages).

* cited by examiner

*Primary Examiner* — Matthew P Travers
(74) *Attorney, Agent, or Firm* — RMCK Law Group PLC

(57) ABSTRACT

A method for joining a belt having a reinforcement structure having a plurality of spirals connected to each other by transverse wires includes compressing the belt along two transverse compression zones and extracting a transverse wire while the belt is being compressed along the transverse compression zones.

5 Claims, 5 Drawing Sheets

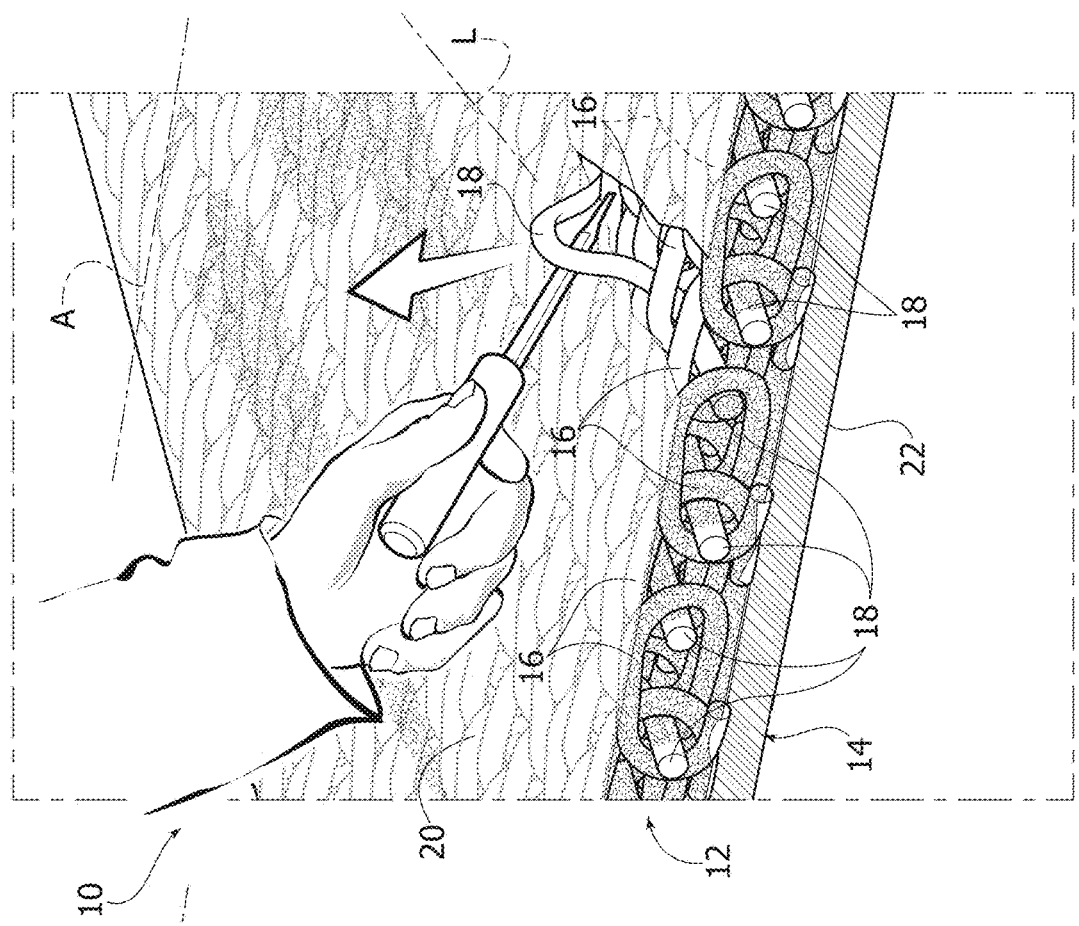
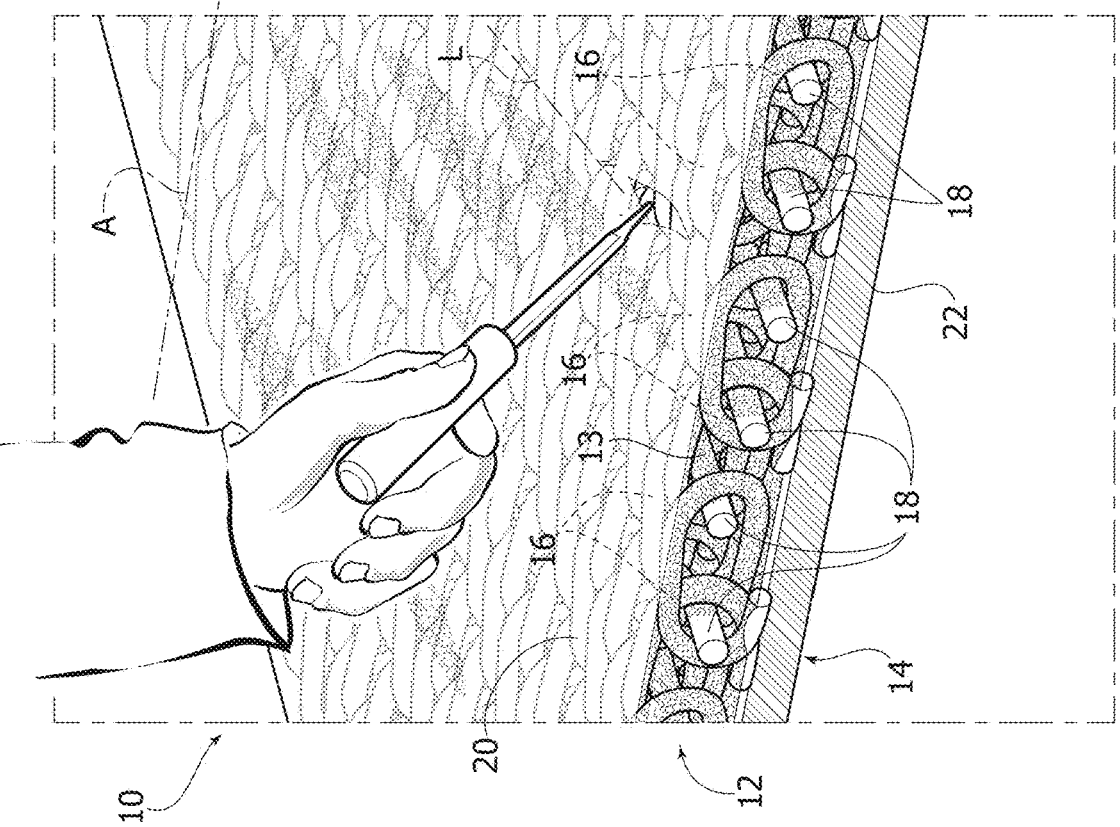

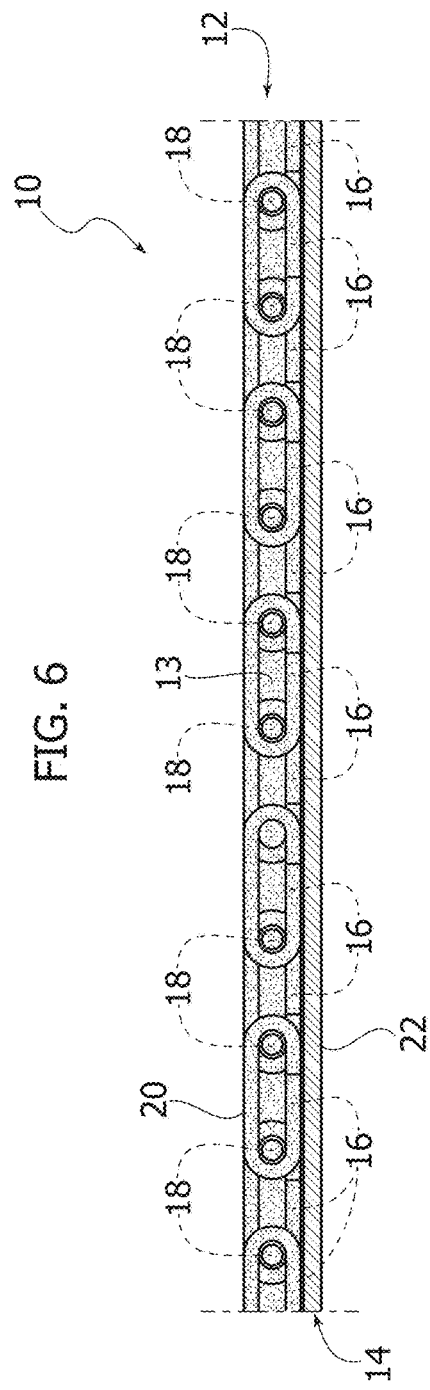
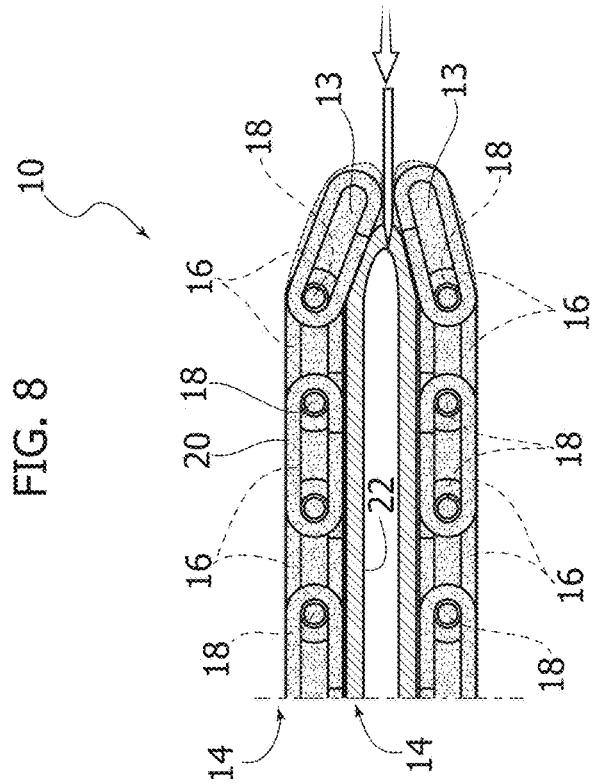
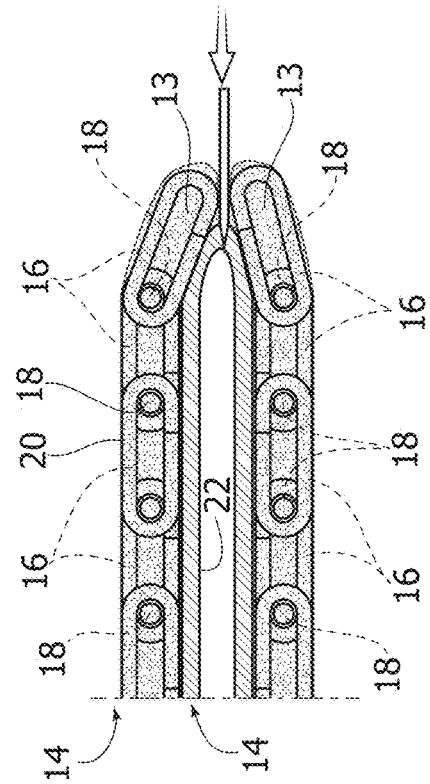
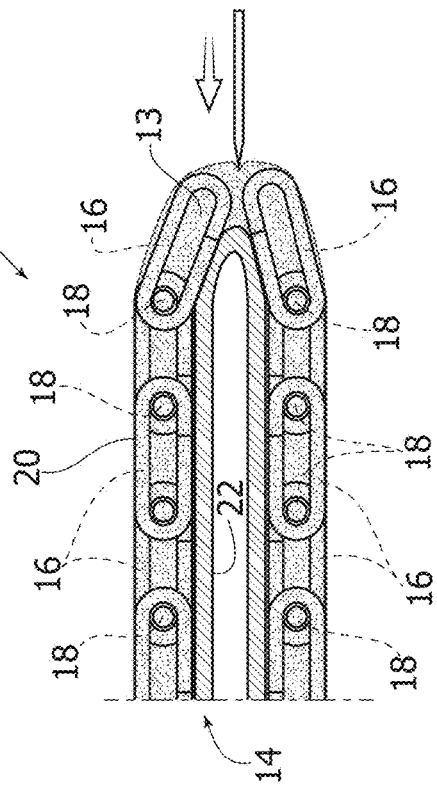

METHOD FOR JOINING A BELT HAVING A REINFORCED STRUCTURE WITH INTERPENETRATED SPIRALS

CROSS-REFERENCE TO RELATED APPLICATION

This application claims priority to Italian Patent Application No. 102020000027798 filed Nov. 19, 2020. The disclosure of the above application is incorporated herein by reference in its entirety.

FIELD OF THE INVENTION

The present invention refers to a method for joining into a closed loop a belt having a reinforcing structure with interpenetrated spirals.

DESCRIPTION OF THE RELATED ART

In the prior art there are known belts having a reinforcing structure incorporated in a coating, wherein the reinforcing structure includes a plurality of spirals. Each spiral is formed by a wire, e.g. a polyester wire, which is wound into a spiral. The spirals are parallel to each other and oriented transversally with respect to the longitudinal axis of the belt. The windings of a spiral are partially interpenetrated with the windings of an adjacent spiral. Straight transverse wires parallel to the axes of the spirals, are inserted between the mutually interpenetrated windings of adjacent spirals. Each transverse wire extends into two adjacent mutually interpenetrating spirals.

An advantageous feature of such belts is the possibility of joining them without having to resort to auxiliary joining components. In order to join a belt into a closed loop, the two spirals which are located at the opposite ends of the belt are interpenetrated with each other, and they are joined by inserting a straight transverse wire into the mutually interpenetrated spirals of both end spirals.

This leads to a junction which keeps the structure uniform, without thicker elements or additional components in the joining zone.

Before joining the opposite ends of a belt into a closed loop it is normally necessary to cut the belt to the desired length. This must be performed without damaging the spirals, so that, after cutting, the belt end includes a continuous spiral, ready to be interpenetrated with a spiral located at the opposite end of the belt.

A known method for preparing the edges of a belt having a reinforcing structure with interpenetrated spirals is described in the video published at the following link: on YouTube titled "ZipLink Conveyor Belt Splicing Instructions" by ConveyEquip.

This known method entails the following steps: incising the coating along a transverse line located along the joining zone between two contiguous spirals, inserting lubricant through said incision, extracting the end of a transverse wire in the vicinity of a lateral edge of the belt, gripping the end of the transverse wire protruding outside the coating with tongs, and extracting the transverse wire so as to disengage two contiguous spirals, cutting the coating of the belt along a transverse cutting line located between the two adjacent spirals disengaged from each other, closing the belt by pressing the two opposite ends one against the other, so that the windings of both spirals may interpenetrate, and inserting a closing transverse wire through the mutually interpenetrated spirals.

The problem of the joining method according to the known art consists in the fact that the step of extracting the transverse wire in order to disengage two contiguous spirals is a very complicated operation. As a matter of fact, the reinforcing structure is incorporated in a filling material which penetrates within the spirals and binds the transverse wire to the spirals. Extracting the transverse wire is therefore particularly difficult, and entails the risk of damaging the belt.

OBJECT AND SUMMARY OF THE INVENTION

The object of the present invention is to provide a method for joining a belt having a reinforcing structure with interpenetrated spirals which overcomes the problems of the prior art.

According to the present invention, this object is achieved by a method having the features set forth in claim 1.

The claims are an integral part of the technical teaching provided herein with reference to the invention.

The present invention includes compressing the belt along two transverse compression zones which are parallel and located on opposite sides with respect to the transverse wire which is to be removed. The extraction of the transverse wire is carried out while the belt is being compressed along said transverse compression zones.

The compression of the belt increases the size of the portions of the spirals through which the transverse wire to be removed extends. This simplifies the extraction of the transverse wire and reduces the risk of damaging the belt during the wire extraction.

BRIEF DESCRIPTION OF THE DRAWINGS

The present invention will now be described in detail with reference to the annexed drawings, which are given by way of non-limiting example only, wherein:

FIGS. 1 and 2 are perspective views which schematically show a preliminary step of the joining method according to the present invention, FIG. 6 is a section showing the belt at the end of the extraction step, FIGS. 7 and 8 are sections showing the step of cutting the coating.

DETAILED DESCRIPTION

Figure 3:
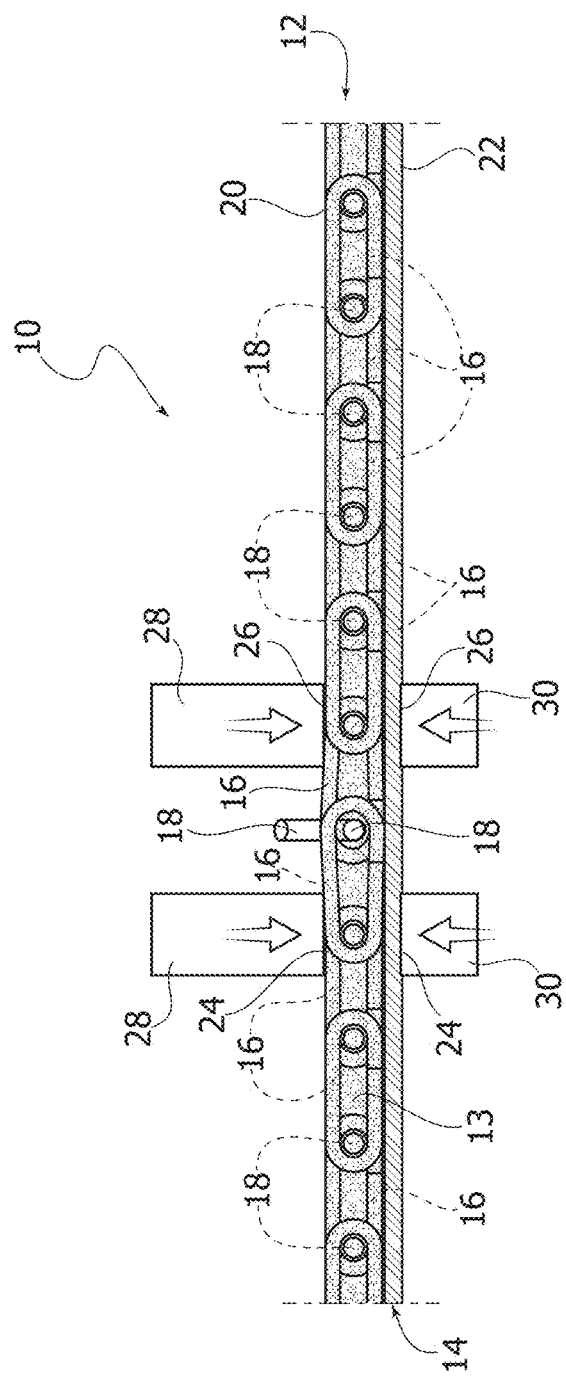
FIGS. 3 and 4 are lateral sections illustrating the step of compressing the wire.

Referring to FIGS. 1 and 2, reference number 10 indicates a belt having a reinforcing structure 12 including a plurality of spirals 16 having the respective axes parallel to each other and oriented orthogonally with respect to a longitudinal axis A of the belt 10. Mutually adjacent spirals 16 are interpenetrated and connected to each other by transverse wires 18 which are parallel to the axes of the spirals. Each transverse wire 18 extends into two adjacent interpenetrating spirals 16. The spirals 16 may be formed of a monofilament polyester wire. In the same way, the transverse wires 18 may be formed of a monofilament polyester wire, which may have the same diameter as the wire forming the spirals 16.

The reinforcing structure 12 is incorporated in a filling material 13 which penetrates inside the spirals 16. A coating 14 is applied on one face of the filling material 13. The filling material 13 and the coating 14 may be formed of any material used for manufacturing conveyor belts, such as e.g. natural or synthetic rubber, nitrile, silam, Teflon, SBR. The coating 14 may also include a fibrous material, such as e.g. cotton or felt. Belts having this construction are known in the state of the art and are commercially available.

In use, belts 10 are joined into a closed loop in order to be mounted on rollers of a belt conveyor. FIGS. 1-9 schematically show the sequence of operations needed to adjust the length of belt 10 as desired, and to join the opposite ends of belt 10 together.

In a first step, shown in FIG. 1, the length of belt 10 is measured and a transverse line L is identified along which belt 10 is to be cut, in order to obtain the desired length. Then, an operator incises a face 20 of the filling material 13 in the vicinity of a lateral edge of belt 10. The incision of face 20 is carried out near the end of a transverse wire 18 extending along a line L.

Subsequently, as shown in FIG. 2, the operator grips, through the incision, the end of the wire 18 extending along line L and extracts the end of the transverse wire 18 through the filling material 13.

Figure 4:
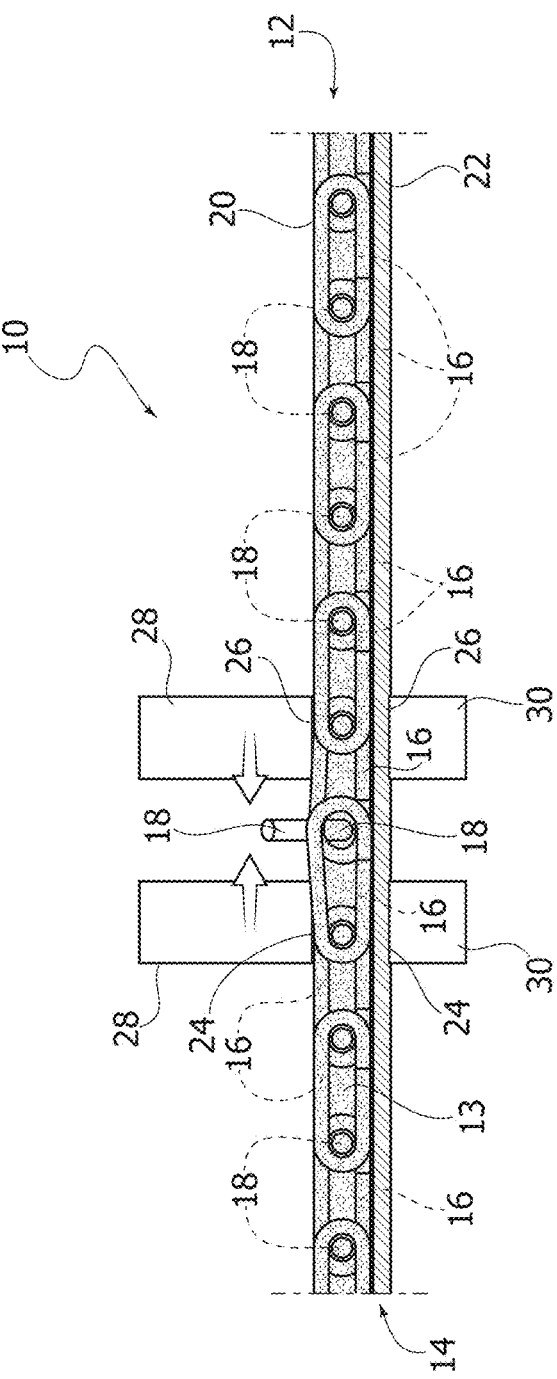

Referring to FIGS. 3 and 4, the belt 10 is compressed along two transverse compression zones 24, 26, which are parallel and located on opposite sides with respect to the line L along which the belt 10 is to be cut. Each transverse compression zone 24, 26 extends transversally with respect to the longitudinal axis A of belt 10 and throughout the width of belt 10. The compression of the belt 10 may be achieved by compressing opposite faces 20, 22 of belt 10 between two blocks 28, clamped one against the other, e.g. by screws and bolts.

The extraction of the end of transverse wire 18 through the filling material 13 of belt 10 may be performed either before or after compressing the belt 10 between blocks 28, 30.

Referring to FIG. 4, after compressing the belt 10 along the transverse compression zones 24, 26, the blocks 28, 30 which compress the belt 10 may be approached to each other, as shown in FIG. 4.

The transverse compression zones 24, 26 compress respective spirals 16 located on opposite sides of line L and connected together by the transverse wire 18 which is to be extracted. The compression of the two mutually interpenetrating spirals 16 from opposite sides of separation line L causes an increase of the diameter of those portions of the spirals which are interpenetrated with each other and engaged by the transverse wire 18. This size increase of the mutually interpenetrated portions of spirals 16 is enhanced by the compression blocks 28, 30 approaching each other.

Figure 5:
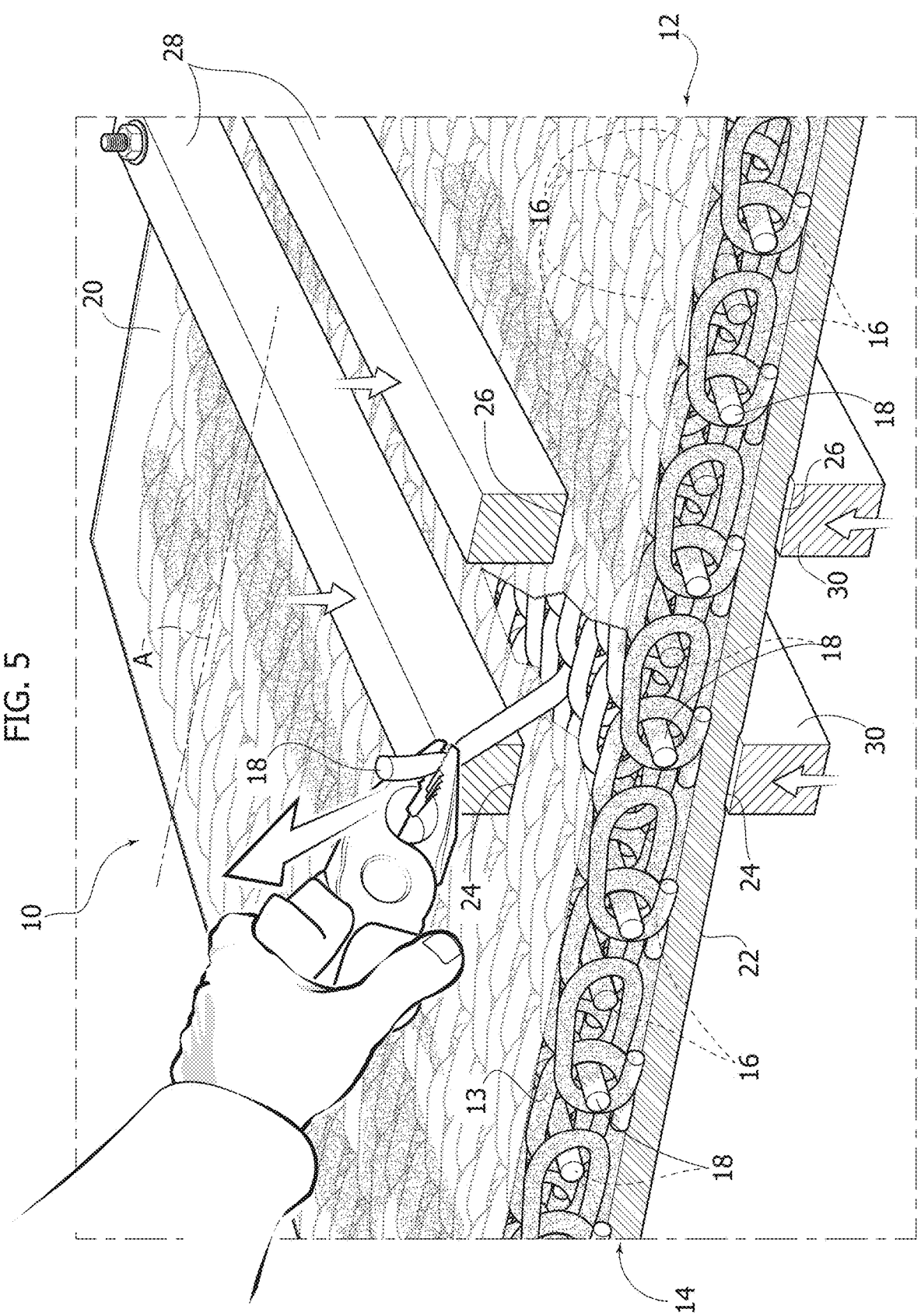
FIG. 5 is a schematic perspective view which shows the step of extracting the transverse wire.

Referring to FIG. 5, while belt 10 is being compressed between the two pairs of blocks 28, 30, the operator grips the end of the transverse wire 18 protruding from face 20 of the filling material 13 by using tongs, and extracts the transverse wire 18 by applying a traction in a transverse direction with respect to longitudinal axis A of belt 10. The extraction of the transverse wire 18 is made much simpler because belt 10 is compressed along the transverse zones in the immediate vicinity to the wire 18 which is to be extracted. Indeed, as stated in the foregoing, said compression tends to increase the size of the spirals located between the two compression zones 24, 26, and helps detaching the transverse wire 18 from the filling material 13 which penetrates into the spirals 16.

After completing the extraction of the transverse wire 18, the two contiguous spirals 16, which were previously connected with each other by the transverse wire 18 which has been removed, are still kept united with each other in the longitudinal direction by the filling material 13 and by the coating 14.

Now, as shown in FIG. 7, the belt 10 is bent so as to mutually disengage the two contiguous spirals which were previously connected by the transverse wire 18 which has been removed. Then, the filling material 13 and the coating 14 are cut between the two contiguous spirals 16, which are now disengaged, as shown in FIGS. 7 and 8.

Figure 9:
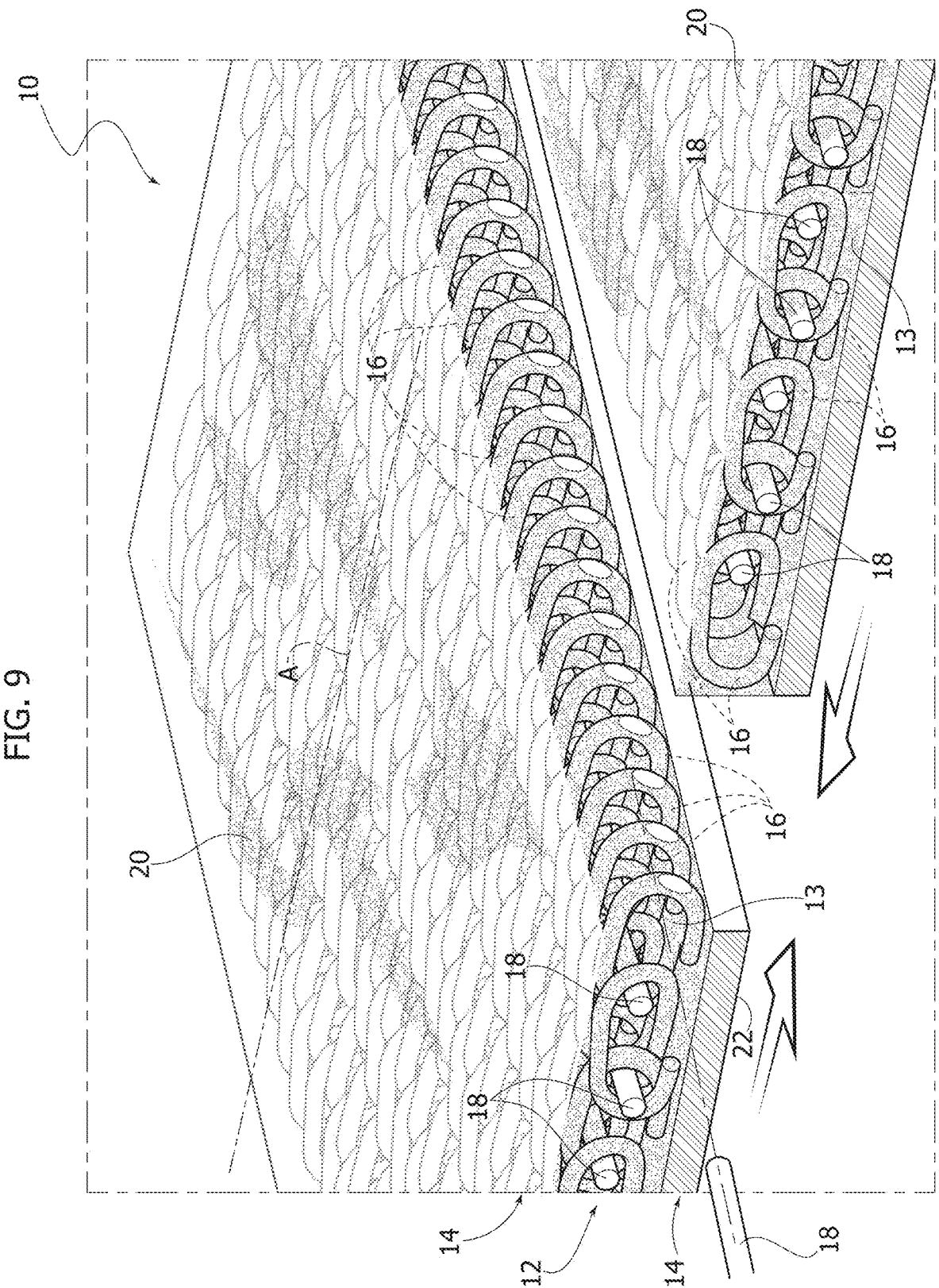
FIG. 9 is a perspective view showing the step of joining the belt.

Now, as shown in FIG. 9, the two opposite ends of belt 10 are contacted with each other, and the two spirals 16 adjacent to the transverse edges of the belt are interpenetrated with each other. Finally, a new transverse wire 18 is inserted between the two spirals 16 located at the opposite ends of belt 10, so as to join the opposite ends of belt 10.

For the operator performing joining, the most difficult step consists in extracting the transverse wire in order to disengage two contiguous spirals. As already stated in the foregoing, this operation is highly simplified by compressing the belt from opposite sides of the transverse wire 18 which is to be extracted, and the wire extraction is performed while the belt is being compressed in the transverse zone adjacent to the wire to be extracted.

Thanks to this solution, it is no longer necessary to incise the surface throughout the length of the belt, nor is it necessary to insert a lubricant through the transverse incision, as it was envisaged in the method according to the known art, to make the extraction of the transverse wire easier. Moreover, the method according to the present invention minimizes the risk of damaging the belt.

Of course, without prejudice to the principle of the invention, the implementation details and the embodiments may vary appreciably from what has been described and shown herein, without departing from the scope of the invention as set forth by the Claims that follow.

The invention claimed is:

1. A method for joining a belt into a closed loop, the belt having a reinforcement structure incorporated in a filling material, wherein the reinforcement structure includes a plurality of spirals parallel to each other and transverse with respect to a longitudinal axis of the belt, wherein adjacent spirals are interpenetrated and are connected to each other by transverse wires parallel to the spirals and wherein each of the transverse wires extends into two adjacent interpenetrating spirals, wherein the method comprises:

identifying a transverse line along which the belt is to be cut, incising a lateral zone of a face of the filling material in a vicinity of one end of a first transverse wire which extends along said transverse line, and extracting the one end of said first transverse wire outside the filling material, compressing the belt along two transverse compression zones which are parallel and located on opposite sides with respect to said transverse line such that diameters of adjacent interpenetrating spirals through which the first transverse wire extends increase, gripping said one end of the first transverse wire protruding outside the filling material and extracting the first transverse wire by applying a traction in a direction transverse to the longitudinal axis while the belt is compressed along said transverse compression zones, disengaging said adjacent interpenetrating spirals which were previously joined together by the first transverse wire which has been extracted, cutting the filling material between said adjacent interpenetrating spirals disengaged from each other,
interpenetrating end spirals of two opposite ends of the belt so as to be mutually interpenetrated, and
inserting a new transverse wire into the mutually interpenetrated end spirals to join the belt in a closed loop.

2. The method of claim 1, wherein said transverse compression zones are moved toward each other in a direction parallel to the longitudinal axis of the belt.

3. The method of claim 1, wherein each of said transverse compression zones is formed by damping the belt between two blocks located on opposite faces of the belt.

4. The method of claim 1, wherein said transverse compression zones extend in a transverse direction to the longitudinal axis between two opposite lateral edges of the belt.

5. The method of claim 1, wherein the step of disengaging said adjacent interpenetrating spirals after the extraction of the first transverse wire is carried out by bending the belt along a folding line extending between said disengaged adjacent interpenetrating spirals.

\* \* \* \* \*